No. 831,620. PATENTED SEPT. 25, 1906.
J. LOVETT.
MACHINE FOR MOLDING PLASTIC MATERIAL.
APPLICATION FILED JAN. 20, 1905.

6 SHEETS—SHEET 1.

Witnesses
Milton E. Lenoir
Watts T. Estabrook

Inventor
John Lovett
by Clement E. Hodges
his Attorney

No. 831,620. PATENTED SEPT. 25, 1906.
J. LOVETT.
MACHINE FOR MOLDING PLASTIC MATERIAL.
APPLICATION FILED JAN. 20, 1905.

6 SHEETS—SHEET 2.

Witnesses
Milton C. Lenoir
Watts T. Estabrook

Inventor
John Lovett
by Vernon C. Hodges
his Attorney

No. 831,620. PATENTED SEPT. 25, 1906.
J. LOVETT.
MACHINE FOR MOLDING PLASTIC MATERIAL.
APPLICATION FILED JAN. 20, 1905.
6 SHEETS—SHEET 3.
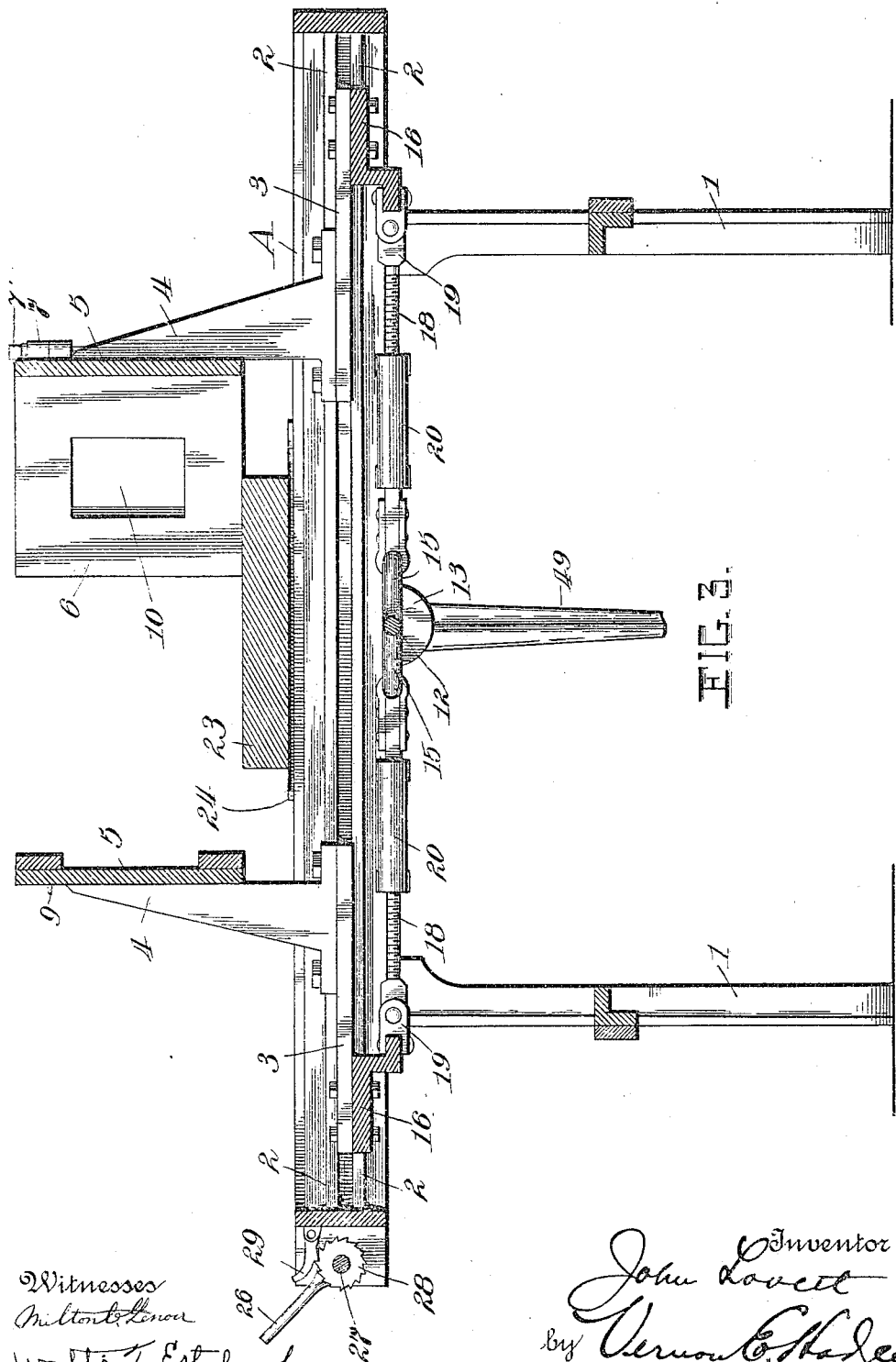

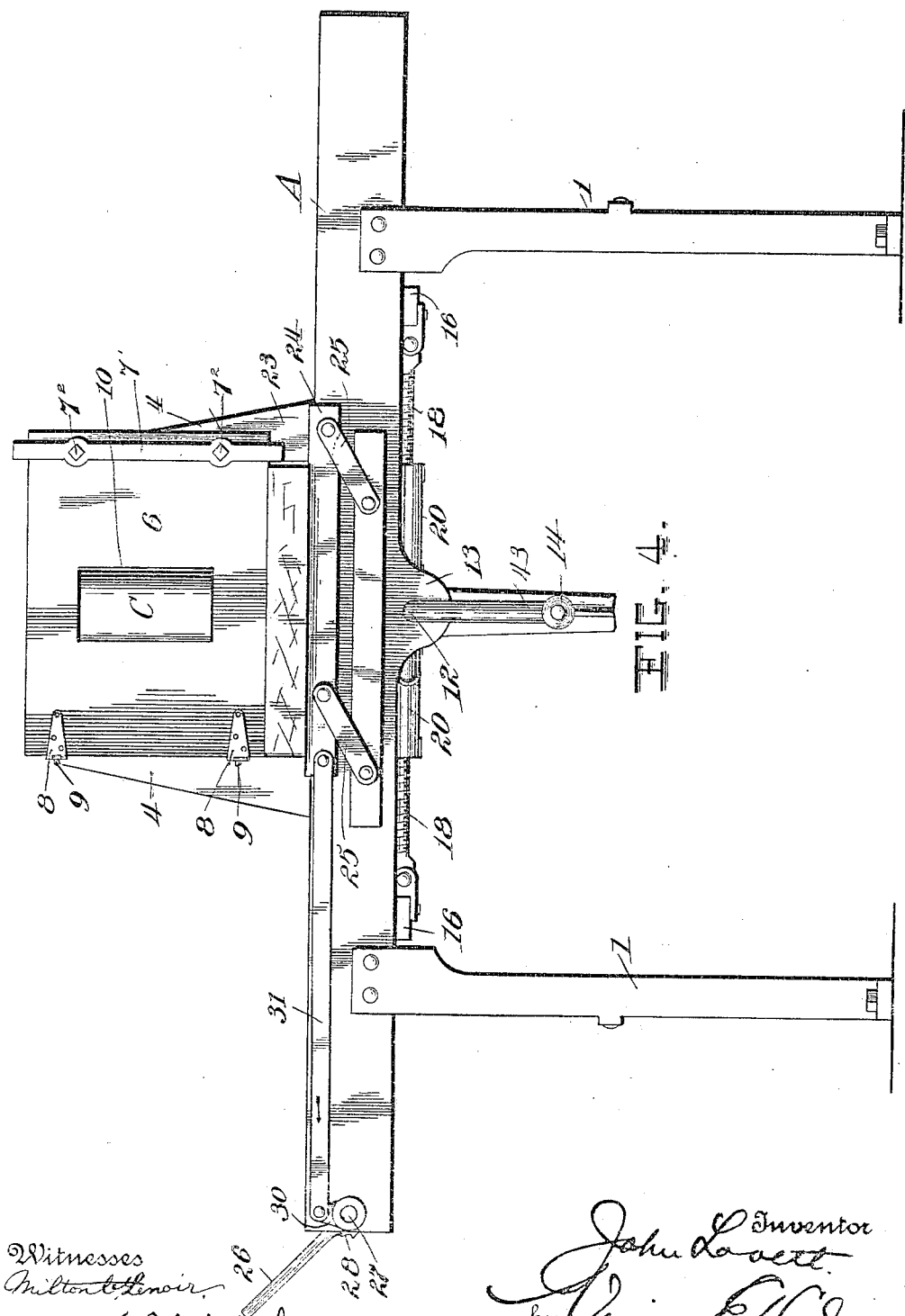

No. 831,620. PATENTED SEPT. 25, 1906.
J. LOVETT.
MACHINE FOR MOLDING PLASTIC MATERIAL.
APPLICATION FILED JAN. 20, 1905.

6 SHEETS—SHEET 5.

Witnesses
Inventor
John Lovett
by his Attorney

No. 831,620. PATENTED SEPT. 25, 1906.
J. LOVETT.
MACHINE FOR MOLDING PLASTIC MATERIAL.
APPLICATION FILED JAN. 20, 1905.
6 SHEETS—SHEET 6.
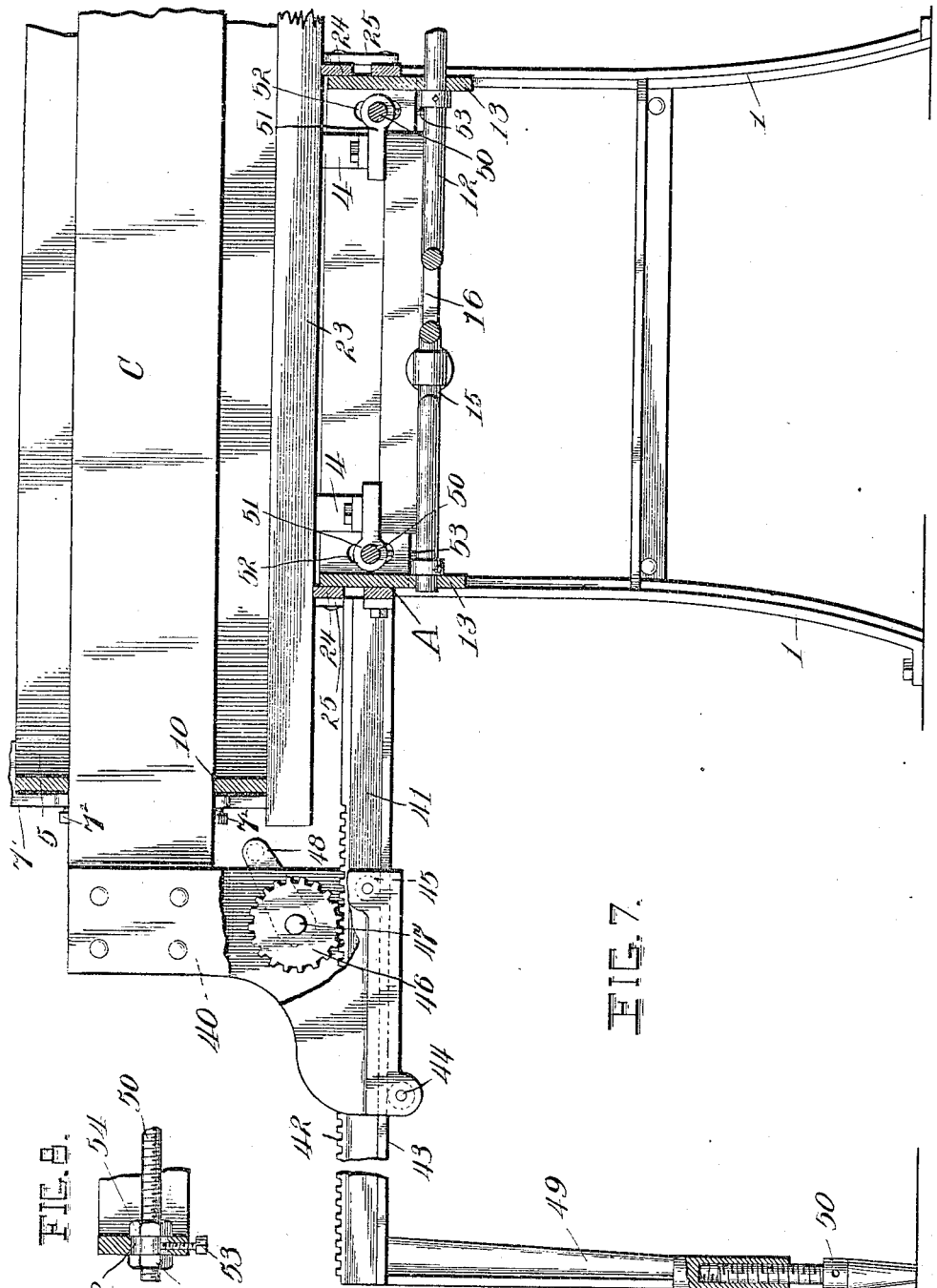
Witnesses
Milton B. Lenoir
Watts T. Estabrook
Inventor
John Lovett
by Vernon E. Hodges
his Attorney

UNITED STATES PATENT OFFICE.

JOHN LOVETT, OF MARTINSBURG, WEST VIRGINIA.

MACHINE FOR MOLDING PLASTIC MATERIAL.

No. 831,620.　　　Specification of Letters Patent.　　　Patented Sept. 25, 1906.

Application filed January 20, 1905. Serial No. 241,957.

*To all whom it may concern:*

Be it known that I, JOHN LOVETT, a citizen of the United States, and a resident of Martinsburg, in the county of Berkeley and State of West Virginia, have invented a new and useful Improvement in Machines for Molding Plastic Material, of which the following is a specification.

My invention relates to a machine for making cement blocks for building purposes, the object being to provide simple mechanism for molding these blocks capable of being easily operated and controlled for closing and opening the mold and for adjusting it to the size of the block to be formed.

Figure 1:
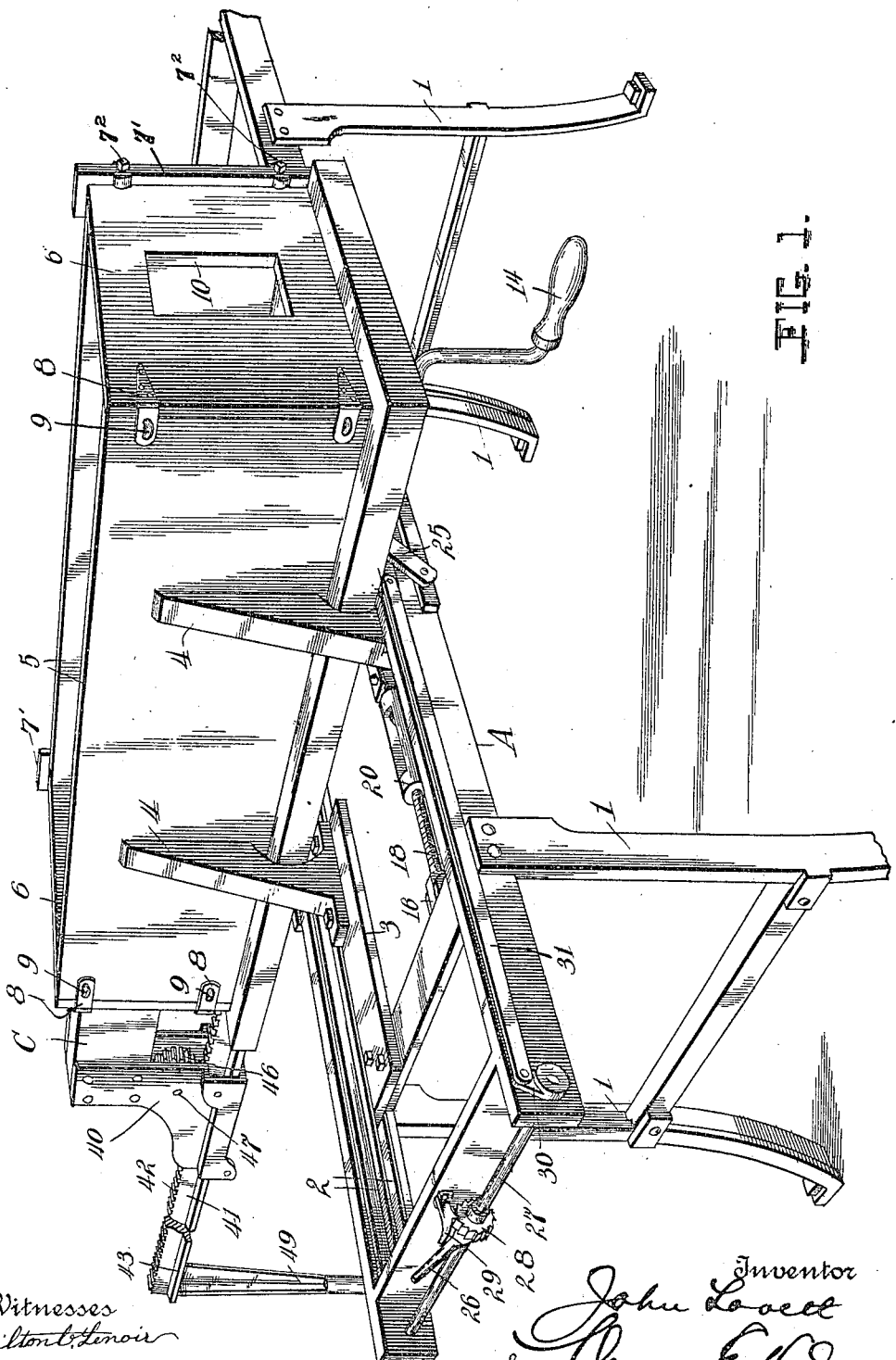
Figure 2:
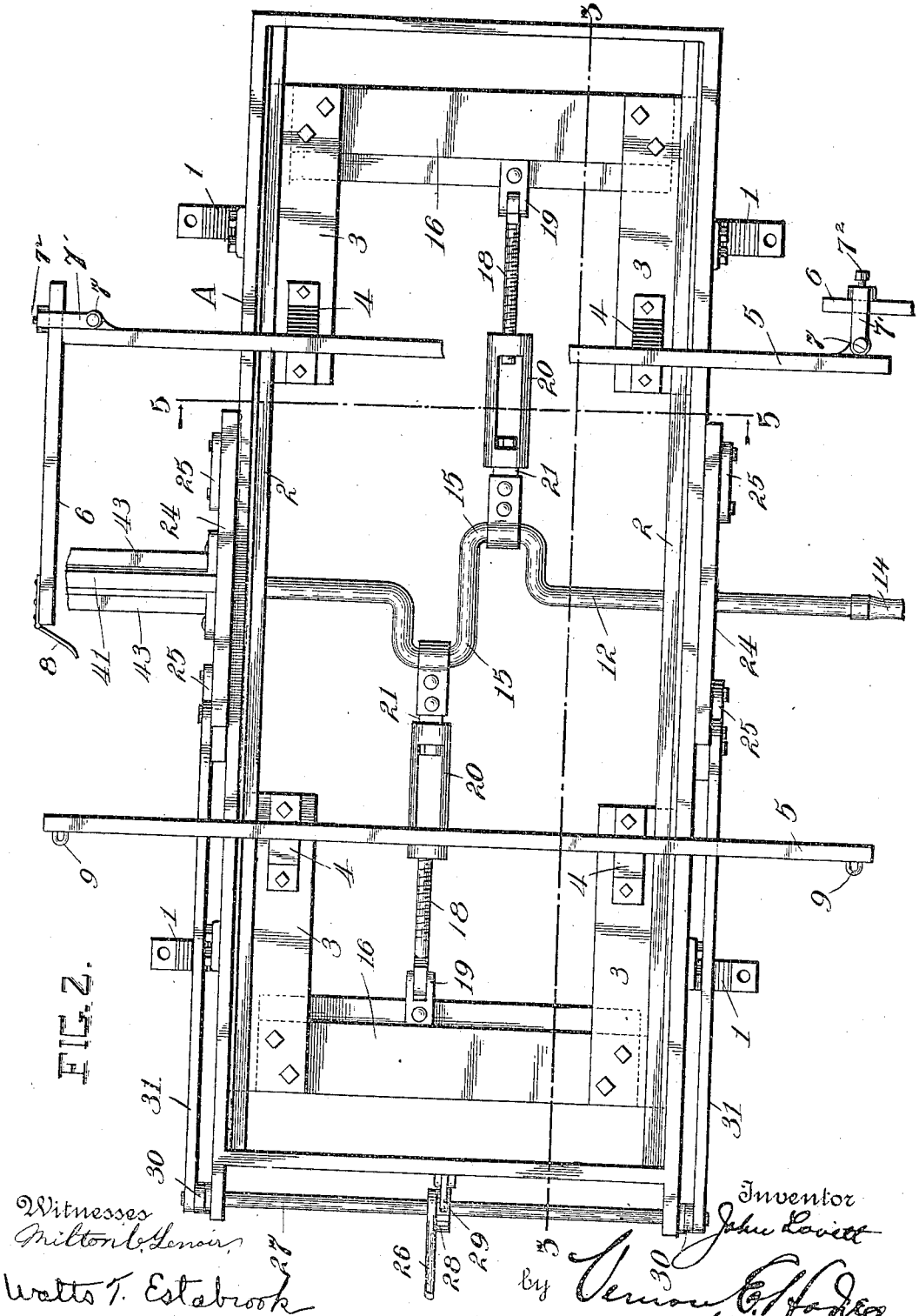
Figure 6:
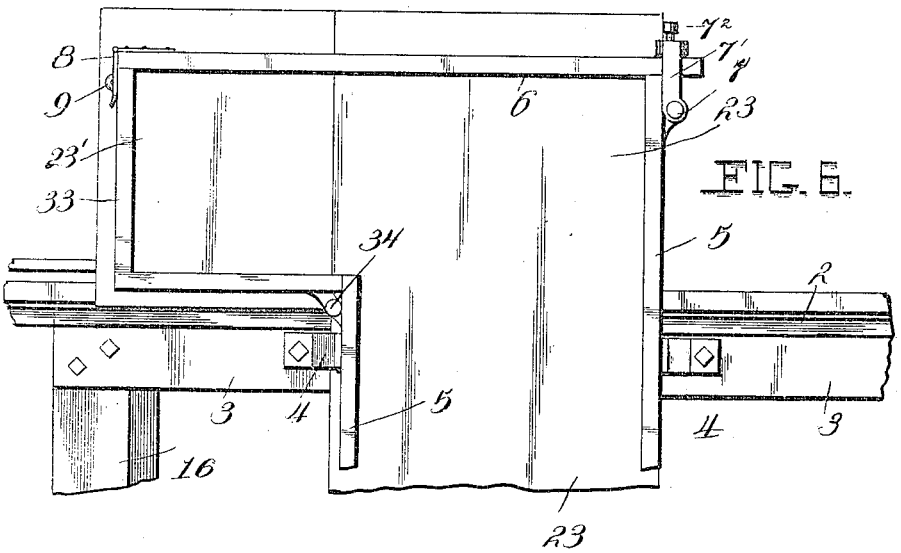
Figure 5:
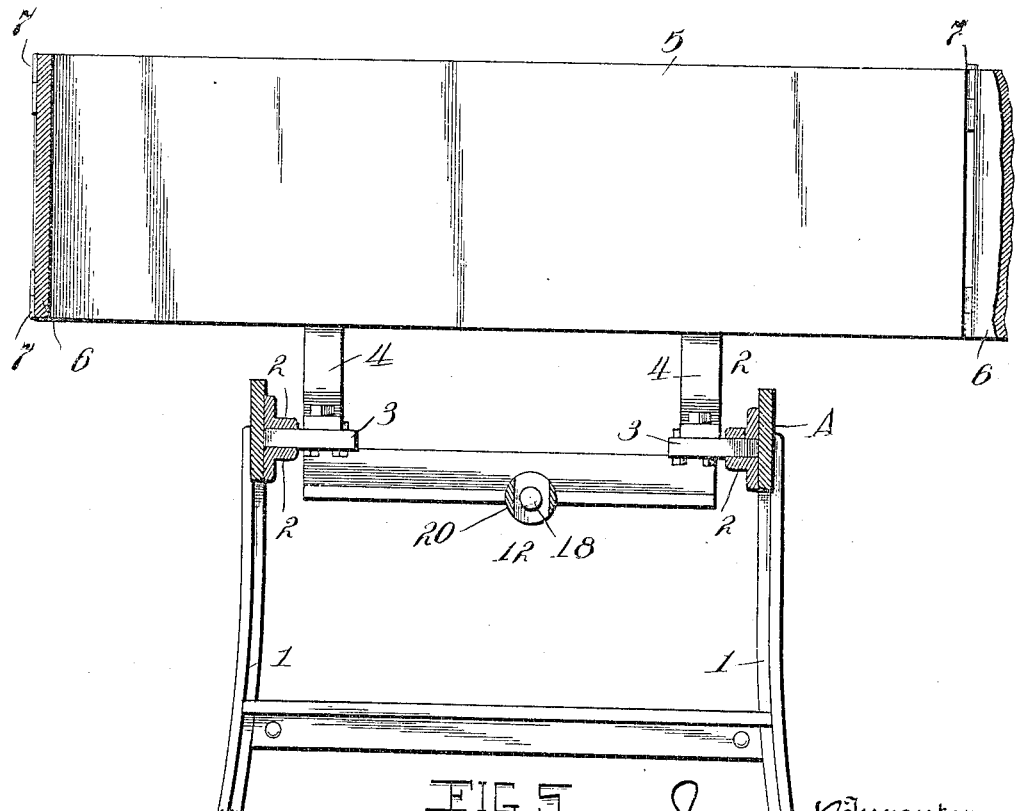

A further object is to provide a knockdown machine which can be made to occupy comparatively small space when not in use or for shipping purposes.
With these objects in view my invention consists in certain novel features of construction and combinations of parts, which will be hereinafter described, and pointed out in the claims.
In the accompanying drawings, Figure 1 is a view in perspective of my improved machine. Fig. 2 is a plan view. Fig. 3 is a transverse vertical section. Fig. 4 is an end view. Fig. 5 is a section on line 5 5 of Fig. 2.
Fig. 6 is a plan view of a portion of the machine used in molding corner-blocks. Fig. 7 is a section through the mold, and Fig. 8 is a detail.

A represents the frame of the machine, and 1 1 are the legs, which support the horizontal bed of the frame. These legs may be made removable and connected together by a removable brace whereby to admit of their being taken apart and from the bed of the frame, to which latter they are preferably bolted, whereby to admit of the parts being shipped or stored in compact form.

Tracks are formed, preferably of angle-irons 2 2, on the inner surface of the bed to receive the sliding carriages 3 3, which are fitted and guided in these tracks, as shown in Fig. 5, one carriage located at each end of the bed, as shown in Fig. 3. These carriages carry uprights 4 4, to which are attached the sides 5 5 of the mold, the latter being held in vertical position regardless of the position of the carriages, as shown in Fig. 3. The ends of the mold are in the form of doors 6 6, hinged at one edge, as at 7 7, and adapted to be fastened at their opposite edges to the opposite sides of the mold by hasps 8 8 or similar means fastening to the staples 9 9 therefor. Of course other means might be employed for fastening these ends, and I have simply described the hasps and staples as a convenient mode of accomplishing the purpose. The ends of the molds might be constructed otherwise than in the form of a door, if desired; but I find the door very simple and convenient for the purpose.

In the ends 6 6 of the mold orifices 10 10 are provided to receive the core C, used in forming the air-space in the blocks, as the blocks which I prefer to construct are cored out or provided with a dead-air space through the center extending vertically and from one end of the block to the other. This core is inserted after the mold is closed and prior to pouring in the plastic material of which the block is formed, the core resting at its ends in the orifices 10 10. After introducing the cement into the mold it is tamped in the usual manner, whereupon the core is removed and the mold opened and the base-board, with the block thereon, is lifted up preparatory to the casting of another block. The core C may be inserted or removed by hand, if desired, and so far as I am aware it is customary to handle it in this way. My invention contemplates mechanical means, however, for controlling the core, which will now be described. The core is securely bolted to the upper end of a carrier 40, as shown in Fig. 7. This carrier straddles a bar 41, which has rack-teeth 42 at the top and is provided with a flange or rail 43 on each side, and the antifriction-rollers 44 and 45 travel beneath and upon these flanges or rails, roller 44 beneath and rollers 45 above, whereby to reduce the friction of the carrier in its travels upon the bar and counteract the tendency of the latter to tip, due to the weight of the core, which is entirely supported at one end. The core is slid in and out by a gear-wheel 46, the teeth of which engage rack-teeth 42, and this gear is turned on its axle 47 by means of the crank 48, by turning which latter the carrier, with the core, is moved in or out. In this way the core is moved with absolute precision, thus obviating any danger of injury to the block, which frequently occurs on account of accident or carelessness on the part of the operator if he does not pull the core out perfectly straight when it is done by hand. The outer end of the bar 41 is supported by a leg 49, and this has a screw-foot 50 to lengthen and shorten it to suit the requirements of irregularity in the surface on which the machine rests.

The mold is opened and closed by the following mechanism and in the following manner: A double-crank shaft 12 is journaled in bearings 13 13, depending beneath the bed and provided with a hand-crank 14 or equivalent means by which it is turned and operated. From the double cranks 15 15, which project in opposite directions, pitmen extend outwardly in opposite directions to the cross-bars 16 16 of the carriage. These pitmen may be variously constructed, but are preferably made extensible, as shown in Figs. 2 and 3, and they comprise in the main threaded bolts 18 18, pivotally connected by means of the knuckles 19 19 to the cross-bars 16 16, and turnbuckles 20 20, having a threaded hole at one end which receive and turn upon the thread-bolts 18 18 and threadless holes at the other ends by which the tail-bolts 21 21 are swiveled to the turnbuckles. By turning these turnbuckles to the right or left the length of the pitmen are adjusted and regulated to give the required length of stroke or movement to the sides of the mold, according to size of block to be formed. For instance, if a relatively wide block is to be molded the pitmen are lengthened; but if, on the other hand, a relatively narrow block is to be cast the pitmen are correspondingly shortened. Of course the ends 6 6 may be in different lengths and removable for the different sizes of blocks to be cast. In order to do away with the necessity of making the ends or doors 6 6 in different lengths, I propose in some instances to employ hinge-studs 7' 7'. These are hinged at 7 7, and the ends or doors 6 6 are made sufficiently long for the largest-sized block, and they have sliding adjustable connections with the stubs, being held in place rigidly by set-screws 7² 7².

In the position shown in Fig. 2 the mold is open. By giving a half-turn to the shaft 12 the mold is closed, the carriages being drawn toward each other simultaneously, and with them the sides of the mold. To open the mold, the shaft is turned in a reverse direction to the position indicated in Fig. 2.

The block is molded on a board 23, which latter is supported upon the end plates 24 24, one of which is located at each side of the bed. These end plates 24 24 are connected to the sides of the bed by the links 25 25, and they are raised and lowered by means of the handle 26 on the rock-shaft 27 and locked in position by the ratchet-toothed wheel 28 on the rock-shaft and the pawl 29, which engages it by gravity. The rock-shaft 27 is provided with a crank 30 at each end, and connecting-rods 31 31 extend from these cranks to the end plates 24 24. The board is raised into position and held in place, therefore, by manipulating this handle 26 by forcing it downward, the gravity-pawl 29 locking the rock-shaft and the cranks 30 30 drawing the connecting-rods 31 31 in the direction indicated by the arrow in Fig. 4, thus raising the end plates, and with them the board 23, into position and throughout all of the movements maintaining it perfectly level.

In Fig. 6 means is shown for molding a corner-block. A supplemental base 23' is employed, it being placed alongside base 23, and the end or door 6 is elongated, and an angle-door 33 is hinged at 34 and held to the end 6 by a hasp or other means 8, as previously described.

In Fig. 7 in lieu of the angle-iron tracks a slightly-different form of construction is illustrated. In lieu of the angle-iron tracks the rods 50 50 are employed, the carriage having the bearing-sleeves 51 51, mounted on these rods. The rods at their ends extend through vertical slots 52 52, in which they are vertically adjusted by set-screws 53 53, upon the ends of which these rods 50 50 rest. Jam-nuts 54 54 are adapted to be screwed up into place against the end of the bed, as shown in Fig. 8, to prevent endwise movement of these rods. By turning the set-screws 53 53 the rods are set so that the mold is perfectly level, after which the jam-nuts may be screwed in place and the rods are held rigidly.

It is evident that slight changes might be resorted to in the form and arrangement of the several parts described without departing from the spirit and scope of my invention, and hence I do not wish to limit myself to the exact construction or constructions herein set forth; but, Having fully described my invention, what I claim as new, and desire to secure by Letters Patent, is—

1. In a machine for molding plastic material, the combination with a bed, reciprocating carriages, and molds carried thereby, of a double crank-shaft and extensible pitmen extending from the cranks of the shaft to the carriages whereby the stroke of the carriages may be varied.

2. In a machine for molding plastic material, the combination with a bed, of end plates, a base adapted to be supported thereon, links pivoted to the bed and to the end plates, and means for moving the end plates endwise simultaneously whereby the base is raised or lowered evenly and horizontally.

3. In a machine for molding plastic material, the combination with a bed, of end plates, a base adapted to be supported thereon, links pivoted to the bed and to the end plates, means for moving the end plates endwise simultaneously whereby the base is raised or lowered evenly and horizontally, said means consisting of a rock-shaft having cranks thereon, connecting-rods extending from the cranks to the end plates, and means for turning and locking the shaft.

4. In a machine for molding plastic material, the combination with a bed, tracks or guides located adjacent to the inner surfaces thereof and extending longitudinally of the bed, carriages guided by said tracks or guides, uprights secured to the carriages and molds carried by the uprights, of a crank-shaft and extensible pitmen extending from the cranks in opposite directions to the carriages whereby the latter are operated simultaneously with the turning of the crank-shaft.

5. In a machine for molding plastic material, the combination with a bed, a mold having orifices in its opposite ends, of a bar extending out from the bed, a carrier adapted to travel thereon, a core carried by the carrier, and means supported by the carrier for moving the latter.

6. In a machine for molding plastic material, the combination with a bed, and mold having orifices in its ends, of a bar having teeth and tracks thereon, a carrier mounted on the bar and carrying a core, a gear-wheel journaled in the carrier with its teeth engaging the rack-teeth and means for turning the wheel whereby to run the core in and out of the mold.

7. In a machine for molding plastic material, the combination with the bed, a mold and a core, of a carrier to which the core is secured, a track upon which the carrier is mounted and on which it travels whereby it is guided in its movements in a straight rectilinear direction, the carrier having anti-friction means which travels on opposite sides of the track whereby to prevent the carrier from binding upon the track due to the weight of the core at one side thereof.

8. In a machine for molding plastic material, the combination with the bed, a mold, and a core, of a carrier to which the core is secured, a track upon which the carrier is mounted and on which it travels whereby it is guided in its movements in a straight rectilinear direction, and an extensible leg for supporting the outer end of the track.

9. In a machine for molding plastic material, the combination with a bed a mold, and a core, of a bar having track-flanges on its opposite sides and teeth on one edge, a carrier to which the core is secured, said carrier mounted on the bar and provided with anti-friction-rollers above and beneath the track, a gear-wheel journaled in the carrier with its teeth intermeshed with the teeth of the rack and means for turning the gear-wheel whereby to move the carrier and the core endwise.

10. In a machine for molding plastic material, a mold comprising movable sides and ends, the ends having sliding hinge connection with the sides.

11. In a machine for molding plastic material, a mold comprising movable sides and ends, and hinges hinged to one of said parts and having sliding adjustable connection with the other.

12. In a machine for molding plastic material, the combination with a bed, and carriages, molds carried by the latter, said molds comprising sides and ends, hinges pivoted to the ends of the sides, the ends of the mold having sliding connection with said hinges and screws or equivalent means for securing the ends to the hinges.

In testimony whereof I have signed this specification in the presence of two subscribing witnesses.

JOHN LOVETT.

Witnesses:
VERNON E. HODGES,
WATTS T. ESTABROOK.